Nov. 18, 1930.   C. ANDRADE, JR   1,781,996
DIFFERENTIAL
Filed Sept. 28, 1926   2 Sheets-Sheet 2

INVENTOR.
Cipriano Andrade Jr

Patented Nov. 18, 1930

1,781,996

UNITED STATES PATENT OFFICE

CIPRIANO ANDRADE, JR., OF NEW YORK, N. Y.

DIFFERENTIAL

Application filed September 28, 1926. Serial No. 138,157.

My invenion relates to differentials; and the object of my invention is to create a roller locking differential of simpler construction and more efficient function than those heretofore in use and to eliminate backlash.

Figure 1:
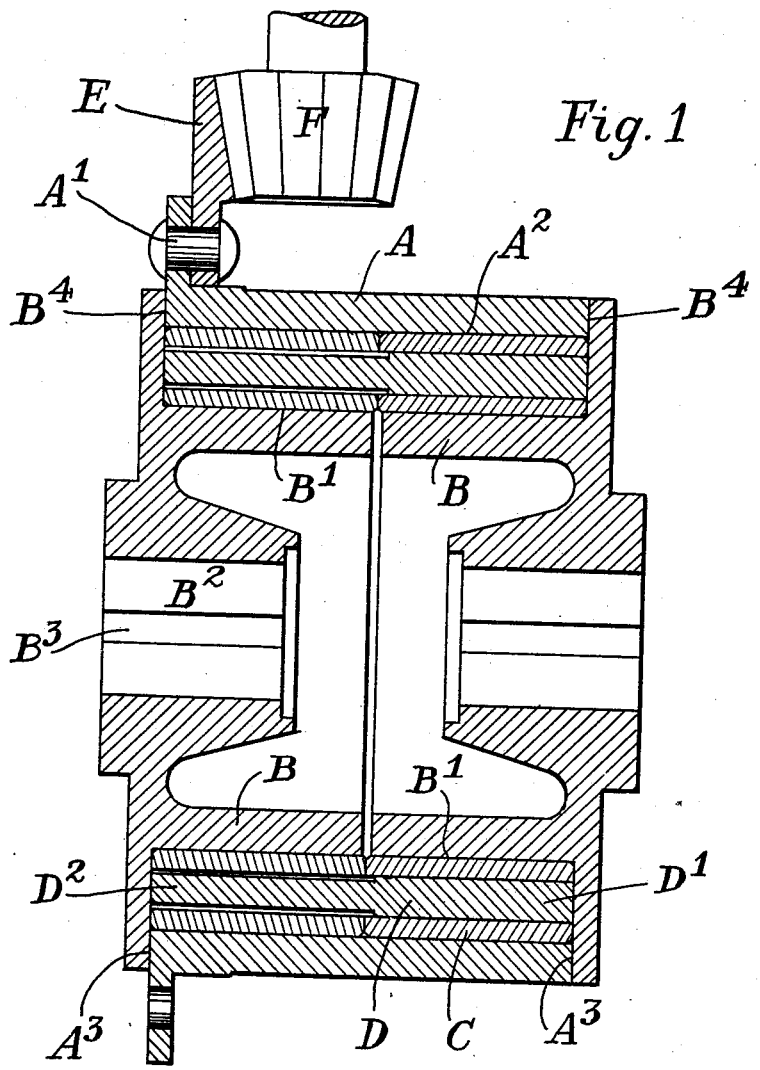
Figure 2:
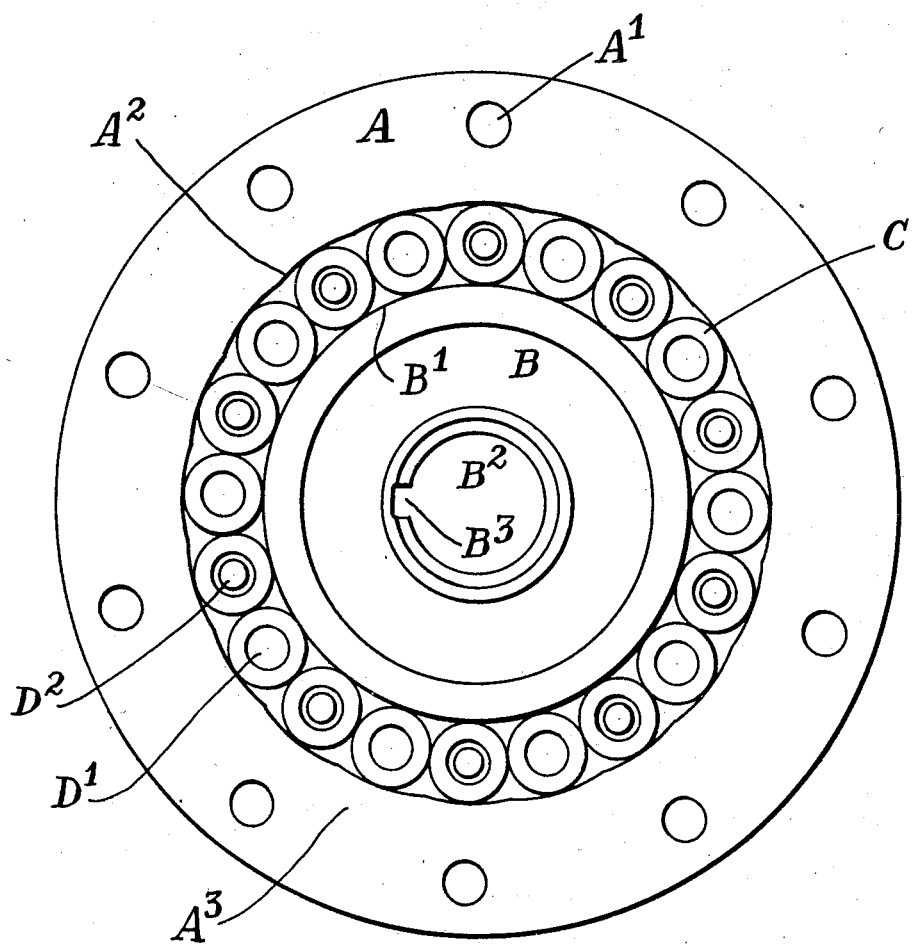

I attain these objects by the mechanism illustrated in the accompanying drawings, in which:

Fig. 1 is a sectional side view of my device; and Fig. 2 is an end view of my device with the left hand driven member B of Fig. 1 eliminated to show the interior arrangement.

Similar letters and numerals refer to similar parts throughout the several views:

A is the driving member; $A^1$ are the bolt holes to hold the bolts which fasten the master gear to the driving member; $A^2$ are the eccentric locking surfaces on the inner face of driving member A; $A^3$ are the end bearing surfaces of driving member A; B are the two driven members; $B^1$ are the circular locking surfaces of driven members B; $B^2$ is the opening in driven member B to admit the axle end; $B^3$ is the keyway to hold the key for the axle end; $B^4$ are the end bearing surfaces of driven members B; C are the hollow locking rollers; D are the control rods; $D^1$ is the large end of the control rod which preferably fits closely into the roller C; $D^2$ is the small end of the control rod which permits a limited circumferential motion of the roller which is over said small end $D^2$; E is the master gear with gear teeth; and F is the drive gear with gear teeth which rotates the master gear E.

It will be understood that the control rod D might be made with its large end $D^1$ integral with a solid roller and with its small end $D^2$ fitting into a roller with an opening larger than $D^2$, as fully disclosed in my issued Patent 1,505,124.

It will be understood that instead of the first set of locking rollers C being in contact with the second set of locking rollers C as shown in Fig. 1, it will be entirely proper to use a spring or solid circular ring between the inside ends of the first set of locking rollers C and the second set of locking rollers C, as shown in my form E in Fig. 1 and Fig. 2 and in my specification in my Patent No. 1,706,867.

And as shown in Fig. 1 it is very good to have the two driven members B not quite in contact with each other.

It will be understood that when my present device is installed in a rear axle housing the usual outside washers, roller bearings or other similar devices on the outside of the differential, and inside of the rear axle housing will keep this differential in assembly, so that the two driven members B cannot work too far apart.

It will be understood that instead of the master gear E being fastened sideways on the left hand end of the driving member A, said master gear E might be fastened sideways on the right hand end of the driving member A, as is well known in some of the Mack trucks. Also said master gear E might be fastened on the middle of the driving member A or made a part of driving member A, and fastened downward instead of sideways, as is well known in some of the other well known trucks and cars. As is well known in the art the master gear can be put at any position desired.

The operation of my device is as follows:

The differential functioning of the rollers and control rods is fully described in my issued Patents Nos. 1,471,642; 1,505,124 and 1,505,687. But by a large number of road tests in cars and trucks it has been found that when the car or truck is running down a hill with the clutch out, or is running at speed on a level road and the clutch is thrown out, the centrifugal throw of the rollers caused by the rapid rotation of the differential forces the rollers C into the centres of the eccentric arcs $A^2$ of the driving member A; and when the rollers are in this position, when the clutch is thrown in, and the driving member starts to rotate at a different speed from the driven members, the rollers in my type of differential covered by my issued Patent 1,505,124 sometimes remain in the centres of the arcs for some appreciable time before they happen to touch the cylindrical surface of the inner driven member and become locked. This produces more or less of a backlash or slip. And this is caused by the fact that there are flange bearings on the outer ends of the driving member in my issued Patent 1,505,124; and in all other known roller locking differentials which have the locking surface of the driving member outside of the locking surface of the driven member there is always some rigidly attached or integral element on said driving member or some element in contact with said driving member, the mechanical disadvantage whereof will hereafter be fully explained; and these flange bearings or other similar elements tend to prevent the locking surface of the driving member and the roller and the locking surface of the driven member from being in direct contact with each other except when the roller is actually brought to the locking point away from the neutral centre of said locking surface of the driving member. But by eliminating the end flanges or other similar elements, as shown in my present device, and as hereinafter fully explained at least one roller on each driven member at all times is in direct pressure contact both with the locking surface of the driving member and also with the locking surface of the driven member, even when the roller is in neutral position at the centre of the eccentric arc of the driving member. And if even one roller is thus in direct pressure contact both with the driving member and a driven member, backlash and slippage becomes impossible, because the moment the driving member starts to rotate faster than the driven member it carries the roller from the neutral centre of the eccentric arc to the locking point of the eccentric arc, and all the other rollers on that driven member are thus forced to lock also. The reason why this highly important and novel function occurs in my present device is due to the elimination of the end flanges or other similar elements. By reference to Fig. 2 hereof it will be observed that the rollers C are all in neutral position at the centres of the eccentric locking surfaces $A^2$. As a matter of fact, while in this neutral position, there is a radial clearance of a few thousandths of an inch between the inner or outer surface of each roller C and the locking surface $B^1$, or the neutral centre of the locking surface $A^2$; this slight radial clearance at the neutral centres of the locking surfaces $A^2$ is a mechanical necessity, in order to allow the rollers to move circumferentially in one direction or the other to the actual locking points in $A^2$ at, for example, one sixteenth of an inch one way or the other from the neutral centre of said locking surface $A^2$.

In like manner, by reference to Figs. 1 and 2 of my Patent No. 1,546,460, it will be noted that the rollers need not necessarily be in direct contact with one another, but if they are held in exact relative circumferential position, as therein shown by the elements Y and Z thereof, which said elements Y and Z are not in circumferential touch either with the driving member A or the driven members B or $B^1$ thereof, the same elimination of backlash could be secured by the other features of my present device herein. In this sense, said rollers C and $C^1$ in my said Patent No. 1,546,460 are merely inferior mechanical equivalents of my rollers C herein. And therefore in my claims herein, when I use the term "locking rollers", this will of course cover either a set of locking rollers in contact with each other as shown in Fig. 2 herein, or a set of locking rollers not in contact with each other as shown for example in my said Patent 1,546,460 or any mechanical equivalent thereof. Of course on the other hand, the rollers in contact with each other are much more efficient in wearing quality than when rollers are not in contact with each other, as fully explained in my said Patent No. 1,505,124.

The elimination of the end flanges not only produces this highly important function, but also very much simplifies and cheapens the production of the differential.

I claim:

1. In a differential; a first set of locking rollers; a second set of locking rollers; a driving member outside of said locking rollers; a first driven member inside of said first set of locking rollers; a second driven member inside of said second set of locking rollers; said driving member being supported only by said locking rollers.

2. In a differential; a first set of locking rollers in contact with each other; a second set of locking rollers in contact with each other; a driving member outside of said locking rollers; a first driven member inside of said first set of locking rollers; a second driven member inside of said second set of locking rollers; said driving member being supported only by said locking rollers.

CIPRIANO ANDRADE, Jr.